US00RE47152E

(19) United States
(12) Reissued Patent
Hatfield et al.

(10) Patent Number: US RE47,152 E
(45) Date of Reissued Patent: Dec. 4, 2018

(54) ALTERING THE APPEARANCE OF A DIGITAL IMAGE USING A SHAPE

(71) Applicant: Microsoft Technology Licensing, LLC, Redmond, WA (US)

(72) Inventors: Larry T. Hatfield, Kirkland, WA (US); Scott H. Douglas, Essex, VT (US); Nicholas W. Rohring, Bothell, WA (US); Matthew J. Kotler, Sammamish, WA (US); Steven P. Geffner, Bothell, WA (US); David Wayne Waltman, Lake Stevens, WA (US); Auston Warner Zahrt, Kirkland, WA (US); Zhao-Hong Mai, Temple City, CA (US)

(73) Assignee: Microsoft Technology Licensing, LLC, Redmond, WA (US)

(21) Appl. No.: 14/938,584

(22) Filed: Nov. 11, 2015

Related U.S. Patent Documents

Reissue of:
(64) Patent No.: 8,582,919
Issued: Nov. 12, 2013
Appl. No.: 11/859,868
Filed: Sep. 24, 2007

(51) Int. Cl.
*G06K 9/00* (2006.01)
*G06T 11/60* (2006.01)

(52) U.S. Cl.
CPC ..... *G06T 11/60* (2013.01)

(58) Field of Classification Search
CPC ..... G06T 11/60
See application file for complete search history.

(56) References Cited

U.S. PATENT DOCUMENTS 4,908,716 A 3/1990 Sakano
4,910,611 A 3/1990 Cok
(Continued)

FOREIGN PATENT DOCUMENTS

CN 1517951 8/2004
CN 1517951 A 8/2004
(Continued)

OTHER PUBLICATIONS

Adobe Photoshop CS2, 2005 Adobe Systems Incoroporated.*
(Continued)

*Primary Examiner* — Yuzhen Ge
(74) *Attorney, Agent, or Firm* — Schwegman Lundberg & Woessner, P.A.

(57) ABSTRACT

Technologies are described herein for altering the appearance of a digital image using a shape. A mask edit mode of operation is provided in which an application program displays a mask shape superimposed on a digital image. The application program also provides user interface controls for altering the size, position, and rotation of the digital image independently of the mask shape, and user interface controls for altering the size, position, and rotation of the mask shape independently of the digital image. When a cropping request is received, the portion of the digital image within the mask shape is mapped onto the mask shape, thereby creating a mask-cropped shape, and a normal editing mode is entered. In the normal editing mode a set of user interface controls is provided for modifying the size, position, and rotation of the mask-cropped shape.

19 Claims, 9 Drawing Sheets

(56) References Cited

U.S. PATENT DOCUMENTS

| | | | | |
|---|---|---|---|---|
| 5,740,266 | A | 4/1998 | Weiss et al. | |
| 5,777,626 | A | 7/1998 | Takashima et al. | |
| 5,949,431 | A * | 9/1999 | Matsumura | G06T 11/60 345/635 |
| 6,084,598 | A * | 7/2000 | Chekerylla | G06T 11/60 345/427 |
| 6,128,013 | A | 10/2000 | Prabhu et al. | |
| 6,333,752 | B1 | 12/2001 | Hasegawa et al. | G06F 3/04845 345/581 |
| 6,587,596 | B1 * | 7/2003 | Haeberli | G06T 11/60 345/626 |
| 6,621,524 | B1 * | 9/2003 | Iijima | H04N 5/262 348/584 |
| 6,973,222 | B2 | 12/2005 | Haeberli | |
| 6,987,535 | B1 * | 1/2006 | Matsugu | G06F 3/04845 348/239 |
| 7,042,467 | B1 | 5/2006 | Hamburg | |
| 7,627,174 | B1 * | 12/2009 | Adams | H04N 1/3872 382/173 |
| 7,734,058 | B1 * | 6/2010 | Adams | G06T 11/60 382/100 |
| 7,751,652 | B2 * | 7/2010 | Tighe | H04N 1/3875 345/626 |
| 8,582,919 | B2 | 11/2013 | Hatfiled et al. | |
| 2003/0194148 | A1 | 10/2003 | Haeberli | |
| 2004/0196298 | A1 | 10/2004 | Nagahashi et al. | G06T 11/60 345/619 |
| 2004/0227976 | A1 | 11/2004 | Pavlov et al. | |
| 2004/0240740 | A1 * | 12/2004 | Ohba | G06F 3/012 382/190 |
| 2005/0162445 | A1 * | 7/2005 | Sheasby | G06T 11/60 345/620 |
| 2006/0078223 | A1 * | 4/2006 | Edwards | G06F 3/04845 382/283 |
| 2006/0129944 | A1 | 6/2006 | Berquist | |
| 2006/0290702 | A1 * | 12/2006 | White | G06T 1/60 345/522 |
| 2006/0290703 | A1 * | 12/2006 | White | G06T 1/60 345/522 |
| 2008/0143740 | A1 * | 6/2008 | Wilensky | G06T 11/60 345/619 |
| 2008/0144970 | A1 * | 6/2008 | Wilensky | G06K 9/48 382/283 |

FOREIGN PATENT DOCUMENTS

| | | |
|---|---|---|
| JP | 10-027258 | 1/1998 |
| JP | 2000-132701 | 5/2000 |
| JP | 2007-509436 | 4/2007 |
| WO | WO 2006/022768 | 3/2006 |

OTHER PUBLICATIONS

Adobe Photoshop 6.0, User Guide. 2000, retrieved Jun. 28, 2012, from http://kfrserver.natur.cuni.cz/obecne/soubory/PhotoShop6/UserGuide.pdf, 448 pages.
Chinese Notice of Alowance dated Apr. 16, 2013 in Chinese Application No. 200880109138.8, 6 pgs.
Chinese Official 2nd Office Action Action dated Apr. 12, 2012 in Chinese Application No. 200880109138.8, 9 pgs.
Chinese Official Decision on Rejection dated Aug. 2, 2012 in Chinese Application No. 200880109138.8, 9 pgs.
Chinese Official First Office Action dated Aug. 15, 2011 in Chinese Application No. 200880109138.8, 16 pgs.
Cropping an Image Using a Shape as a Mask, Keynote 3.0 Help, 2007, Apple Inc., pp. 1.
European extended Search Report in Application 08834669.7, dated Apr. 3, 2012, 10 pgs.
European Notice of Allowance in Application 08834669.7, dated Jun. 13, 2013, 7 pgs.
European Office Action in Application 08834669.7, dated Nov. 28, 2012, 4 pgs.
European Official Communication in Application 08834669.7, dated Apr. 20, 2012, 1 page.
How to Master Illustrator: Basic Operations for Illustrator, Mac Fan Special 11, Japan, Mainichi Communications Corp., Aug. 31, 2000, pp. 106 to 127.
Korean Preliminary Rejection in Application 10-2010-7005928, dated Jul. 31, 2014, 16 pgs.
Masking with Shapes, 2007, Apple Inc, pp. 2.
PCT International Search Report dated Feb. 13, 2009 in International Application No. PCT/US2008/074519, 10 pgs.
U.S. Appl. No. 11/859,868, Amendment and Response dated Dec. 24, 2012, 18 pgs.
U.S. Appl. No. 11/859,868, Amendment and Response dated Dec. 8, 2011, 15 pgs.
U.S. Appl. No. 11/859,868, Amendment and Response dated Jun. 23, 2011, 10 pgs.
U.S. Appl. No. 11/859,868, Amendment and Response dated Jun. 25, 2013, 16 pgs.
U.S. Appl. No. 11/859,868, Amendment and Response dated Aug. 14, 2012, 18 pgs.
U.S. Appl. No. 11/859,868, Notice of Allowance dated Jul. 8, 2013, 9 pgs.
U.S. Appl. No. 11/859,868, Office Action dated Mar. 23, 2011, 13 pgs.
U.S. Appl. No. 11/859,868, Office Action dated Apr. 5, 2013, 27 pgs.
U.S. Appl. No. 11/859,868, Office Action dated May 14, 2012, 14 pgs.
U.S. Appl. No. 11/859,868, Office Action dated Aug. 24, 2012, 23 pgs.
U.S. Appl. No. 11/859,868, Office Action dated Sep. 8, 2011, 17 pgs.
"Office Action Issued in Indian Patent Application No. 1394/CHENP/2010", dated Mar. 22, 2018, 6 Pages. (MS# 320955-IN-PCT).
"Look Behind the Mask" in Illustrator CS2 Excerpted from "Real Wordl Adobee Illustrator CS2" by Mordy Golding, 2005, published by Pearson Education, Inc.*
YouTube Video titled "Adobe Illustrator CS2 Lessons—clipping masks" by user Lazarosark, posted Nov. 2, 2008, website: http://www.youtube.com/watch?v=lvkVJLMzmBW.*
Adobe Creative Suite 3 Video Workshop tutorial, titled "Working with Clipping Masks and Pathfinder Effects in Illustrator" by Mordy Golding, Apr. 2007, http://www.adobe.com/designcenter/video_workshop/?id=vid0057; http://www.adobe.com/designcenter/video_workshop/html/vid0057.html.*
Adobe Illustrator CS2 Press Release Date Apr. 4, 2005.*
Adobe Illustrato CS3 Press Release Date Mar. 27, 2007.*
YouTube Video, titled: "Adobe Photoshop Clipping Mask Part 2" by Author technoscott, uploaded on Dec. 15, 2006.*
Dennis, Anita et al. "Adobe Photoshop CS2 Classroom in a Book" May 24, 2005, Adobe, ISBN:0-321-32184-7, pp. 373-384.*
Cavanaugh, "Uncovering Fireworks Masks: Masking with Bitmaps", May 18, 2005, SYS-Con-Media, pp. 6.
Chinese Official Action dated Apr. 12, 2012 in Chinese Application No. 200880109138.8.
European Search Report dated Apr. 3, 2012 in European Application No. 08834669.7.
Chinese Official Action dated Aug. 2, 2012 in Chinese Application No. 200880109138.8.
Japanese Official Action dated Sep. 19, 2012 in Japanese Application No. 2010-526994.
Makoto Ito, "How to Use Illustrator: Secrets for Successful Designs & Illustrations," MdN, vol. 143, Japan, MdN Corporation, Mar. 1, 2006, vol. 143, pp. 32 to 37.
European Official Action dated Nov. 28, 2012 in European Application No. 08834669.7-2218.

* cited by examiner

ALTERING THE APPEARANCE OF A DIGITAL IMAGE USING A SHAPE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

Many types of computer application programs provide functionality for inserting digital images into electronic documents. For instance, many word processing application programs, spreadsheet application programs, and presentation application programs permit digital images to be inserted into an appropriate document. However, the functionality provided by these types of application programs for allowing a user to quickly improve the look of a digital image is generally limited.

As an example, it is very difficult using current application programs to highlight or isolate a particular region within a digital image. While some application programs do permit the cropping of a digital image, the current solutions generally involve multiple steps, a complex user interface, or both. It is also generally difficult to change the shape of a digital image within a document. For instance, it can be a very complex process to change the shape of a rectangular digital image to a star shape or to a heart shape.

In order to isolate a particular region of a digital image, or to change the shape of a digital image, previous application programs generally require a user to "paint" a texture mask that is utilized to mask off a portion of the image. This approach is very time consuming, however, and requires artistic skill that many users do not possess. Moreover, once the texture mask has been painted, it is very difficult to edit and, in many cases, must be manually repainted to achieve a different effect. Additionally, even after application of the texture mask, the underlying digital image still retains its original rectangular shape, thereby making it difficult to apply effects to edge of the masked digital image.

It is with respect to these considerations and others that the disclosure made herein is presented.

SUMMARY

Technologies are described herein for altering the appearance of a digital image using a shape. In particular, through the utilization of the technologies and concepts presented herein, a user can easily and quickly change the shape of a digital image by visually placing and adjusting a mask shape that crops the digital image, or a portion of it, to a specifically-sized geometric shape. The digital image is mapped to the mask shape, thereby allowing effects to be easily applied to the edges of the mask-cropped shape.

According to one aspect presented herein, an application program is provided that includes a user interface for altering the appearance of a digital image using a mask shape. The mask shape defines the area of a digital image that will be retained following a masking operation and may take any shape. In order to allow a user to easily define the size and position of the mask shape with respect to the digital image, the application program provides a mask edit mode of operation. The portion of the digital image located outside the mask shape is not rendered outside of the mask edit mode of operation.

The mask edit mode of operation may be entered in response to a user request to apply a mask shape to a digital image, in response to a user request to fill the mask shape with the digital image, or in response to a user request to enter the mask edit mode of operation directly. While in the mask edit mode of operation, the application program displays the mask shape superimposed on the digital image. The application program also provides user interface controls for altering the size, position, and rotation of the digital image independently of the mask shape. The application program also provides user interface controls for altering the size, position, and rotation of the mask shape independently of the digital image. Through the use of these user interface controls, a user can easily define the portion of the image that is to be masked using the mask shape.

While in the mask edit mode of operation, the portion of the digital image that is located outside of the mask shape may be displayed in a manner that indicates that this portion will be cropped when a cropping request is received. For instance, the portion of the digital image that is located outside of the mask shape may be displayed using a transparency effect to provide such an indication. Other types of effects may be similarly utilized to provide a visual indication of the portion of the digital image that will be cropped when the mask edit mode is exited.

When a cropping request is received, the portion of the digital image within the mask shape is mapped onto the mask shape, thereby creating a mask-cropped shape. In one embodiment, the cropping request comprises a request to exit the mask edit mode of operation but may take other forms, the selection of a user interface object provided for indicating that the image should be cropped.

Once the portion of the digital image within the mask shape has been mapped onto the mask shape, a normal editing mode is entered. In the normal editing mode, user interface controls are provided for modifying the size, position, and rotation of the mask-cropped shape. Because the digital image is mapped to the mask shape during the masking operation, visual effects can be easily added to the edges of the mask-cropped shape. For instance, edge effects like shadows and bevel effects can be added to the edges of the mask-cropped shape. At any time, the mask edit mode of operation can be invoked to independently alter the size, shape, and rotation of the digital image and the mask shape.

It should be appreciated that the features presented herein may be utilized with any type of computer program that provides functionality for utilizing digital images. It should also be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
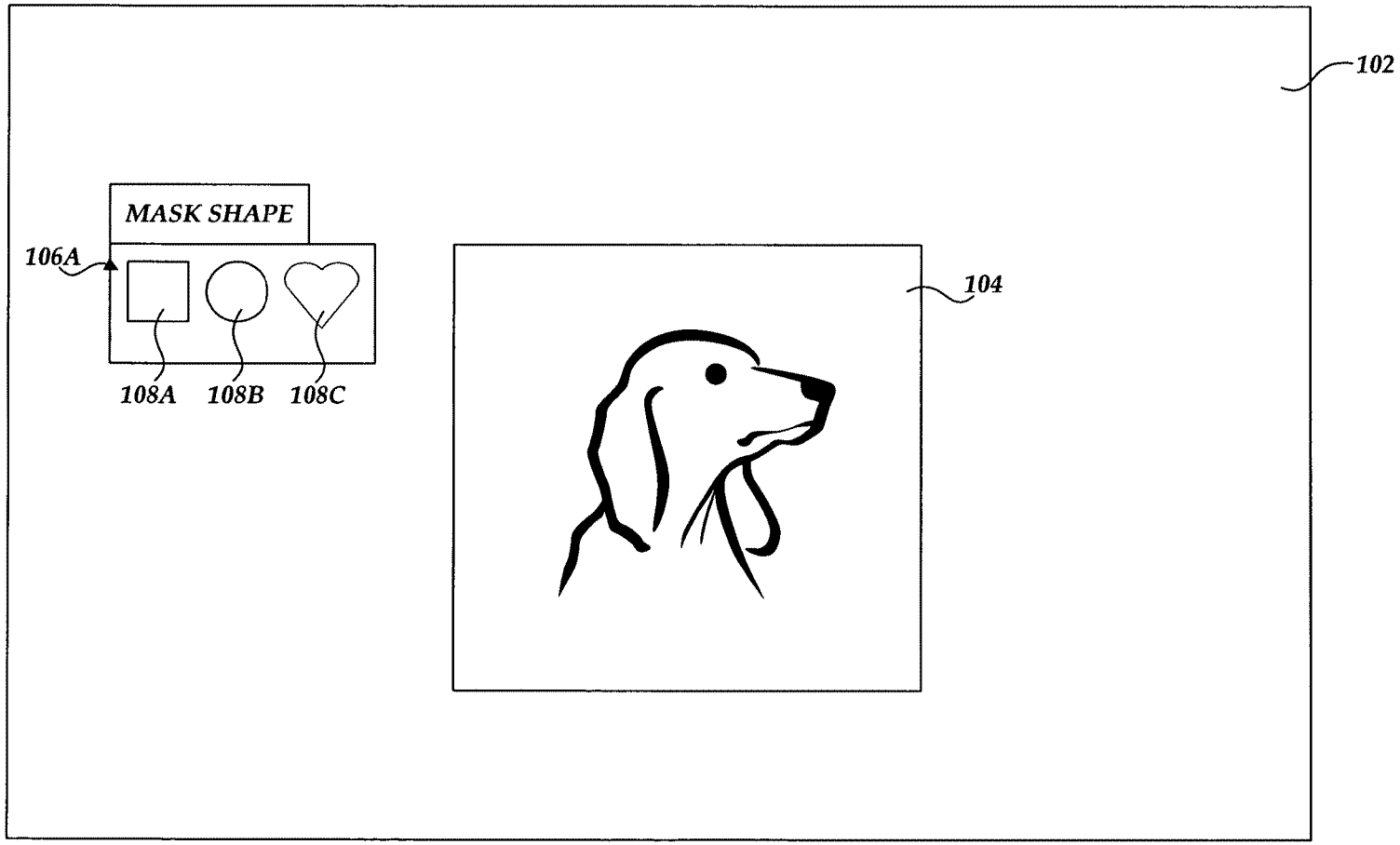
FIGS. 1-7 are user interface diagrams showing aspects of an illustrative user interface provided in embodiments described herein for modifying the appearance of a digital image with a shape.

The following detailed description is directed to technologies for altering the appearance of a digital image using a shape. Through the use of the embodiments presented herein, a user can easily and quickly change the shape of a digital image to a specifically sized geometric shape. Visual effects can also be easily applied to the edges of the mask-cropped shape. Additional details regarding the various embodiments presented herein will be provided below with reference to FIGS. 1-9.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for altering the appearance of a digital image using a shape will be described.

Turning now to FIG. 1, details will be provided regarding one embodiment presented herein for altering the appearance of a digital image using a shape. In particular, as will be described in greater detail herein, an application program that embodies the concepts provided herein is operative to provide a mask edit mode. A mask edit mode is a mode of operation that allows a user to control the position of a mask shape and a digital image relative to one another by controlling the size, rotation, and position of the mask shape and the digital image. As will be discussed in greater detail below, the mask edit mode of operation is invoked whenever a user requests to add a shape mask to a digital image, to fill a shape with a digital image, or through the selection of an appropriate user interface control for entering the edit mask mode of operation.

FIG. 1 illustrates the first entry point into the mask edit mode of operation whereby a user has placed a digital image 104 onto an application-provided canvas 102. The canvas 102 may comprise any type of document, including a word processing document, a presentation document, a spreadsheet document, or any other type of document. In the example shown in FIG. 1, a user has also requested that a mask shape be applied to the digital image 104. An appropriate user interface control, such as a pull down menu, may be utilized by a user to generate such a request. In response to such a request, the drop-down menu 106A has been displayed. The drop-down menu 106A includes the icons 108A-108C corresponding to mask shapes having different geometric configurations. For instance, the icon 108A corresponds to a square mask shape, the icon 108B corresponds to a circular mask shape, and the icon 108C corresponds to a heart mask shape. In response to the selection of one of the icons 108A-108C, the corresponding mask shape is applied to the digital image 104 and the mask edit mode of operation is entered. This process is illustrated in greater detail below with respect to FIG. 2.

Figure 2:
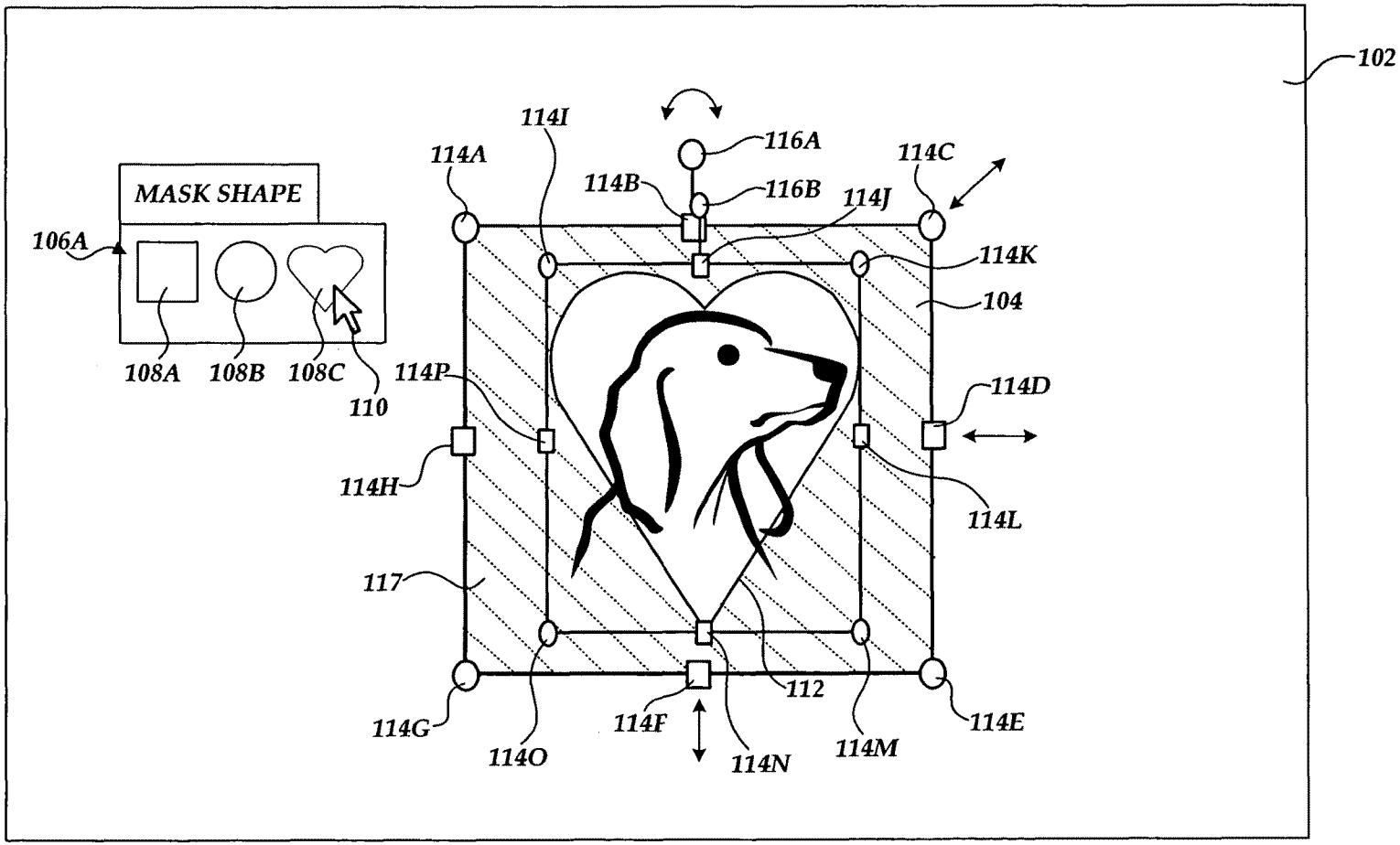

In the illustrative user interface shown in FIG. 2, a user has selected the icon 108C using a cursor 110 controlled by an appropriate user input device. In response to such a selection, a mask shape 112 has been displayed superimposed over the digital image 104. In one implementation, the mask shape 112 comprises a vector image that can have any geometry. However, in general, a mask shape may be any type of two-dimensional or three-dimensional object to which a digital image may be applied as a fill. In the example shown in FIG. 2, the mask shape 112 is in the shape of a heart. It should be appreciated that a virtually endless number of shapes, including user created shapes, may be provided in the drop-down menu 106A and utilized as a mask for the digital image 104.

In one implementation, a set of user interface controls is displayed in conjunction with the mask shape 112 that allows a user to resize, rotate, and reposition the mask shape 112. In particular, in the example shown in FIG. 2, the set of user interface controls includes a number of drag handles 114I-114P. Through the use of the drag handles 114I-114P, a user can change the size of the mask shape 112. The set of user interface controls also includes a rotate handle 116B. When selected, the rotate handle 116B allows a user to change the rotation of the mask shape 112. A user may also directly select the mask shape 112 using the cursor 110 for instance, to change the position of the mask shape 112 on the canvas 102. According to embodiments, user interface controls may also be provided for editing or modifying the geometry of the mask shape 112 either by directly editing the mask shape 112 or by combining the mask shape 112 with other shapes.

In this implementation, the digital image 104 also includes a set of user interface controls for modifying the size, position, and rotation of the digital image 104 independently of the size, position, and rotation of the mask shape 112. In particular, in the implementation shown in FIG. 2, the set of user interface controls includes a number of drag handles 114A-114H for modifying the size of the digital image 104. The set of user interface controls also includes the rotate handle 116A for modifying the rotation of the digital image 104. The digital image 104 may also be selected, for instance, using the cursor 110, and repositioned on the canvas 102. It should be appreciated that through the use of the user interface controls illustrated in FIG. 2 and described above, the size, position, and rotation of the mask shape 112 and the digital image 104 can be specified independently of one another. It should also be appreciated that the specific user interface controls illustrated in FIG. 2 are merely illustrative and that other types of user interface controls may be provided for specifying the size, position, and rotation of the mask shape 112 and the digital image 104.

In one implementation, the portion 117 of the digital image 104 outside of the mask shape 112 is displayed in a manner that indicates that the portion 117 will be cropped when the mask edit mode is exited. For instance, in one implementation, the portion 117 of the digital image 104 outside the mask shape 112 is displayed in a transparent fashion. Other types of visual effects may be utilized to display the portion 117 of the digital image 104 outside the mask shape 112 in a manner that conveys to a user that the portion 117 will be cropped when the mask edit mode is exited. Additional details regarding the functionality provided by the user interface controls shown in FIG. 2 will be provided below with respect to FIG. 3.

Figure 3:
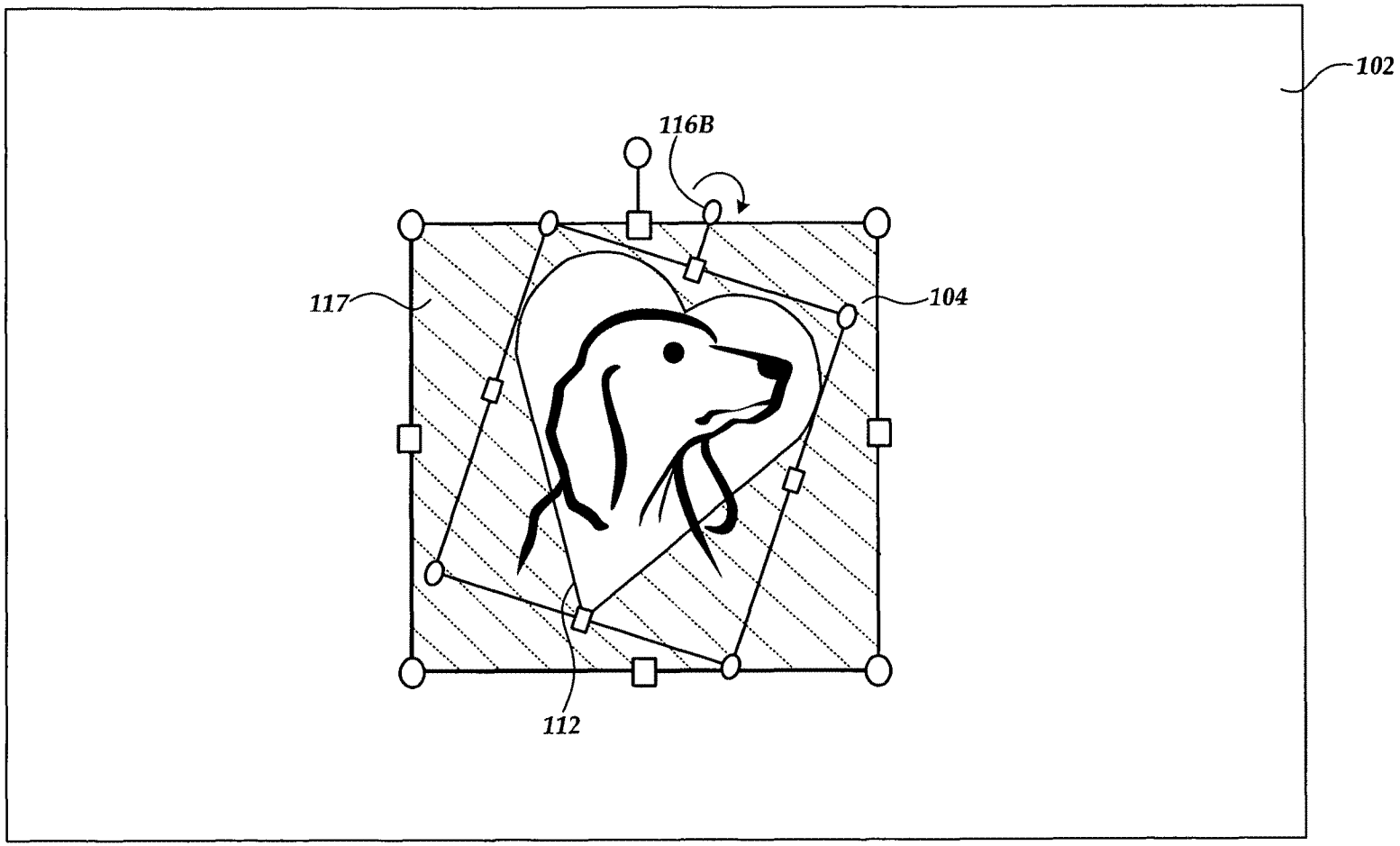

Referring now to FIG. 3, additional details will be provided regarding the functionality of the user interface controls described above with respect to FIG. 2 in one implementation. In the example shown in FIG. 3, the rotate handle 116B has been selected and utilized to rotate the mask shape 112 clockwise. As a result, the mask shape 112 has been rotated clockwise on the canvas 102. It should be appreciated that in one implementation the digital image 104 is not rotated. It should also be appreciated that a similar effect could have been achieved by rotating the digital image 104 in a counterclockwise fashion. It should therefore be appreciated that through the use of the user interface controls discussed herein with respect to FIG. 3 and above with respect to FIG. 2, the size, rotation, and placement of the digital image 104 and the mask shape 112 may be independently specified in a manner to crop the digital image 104 using the mask shape 112 in virtually any fashion. Additional details regarding this process will be provided below with respect to FIG. 4.

Figure 4:
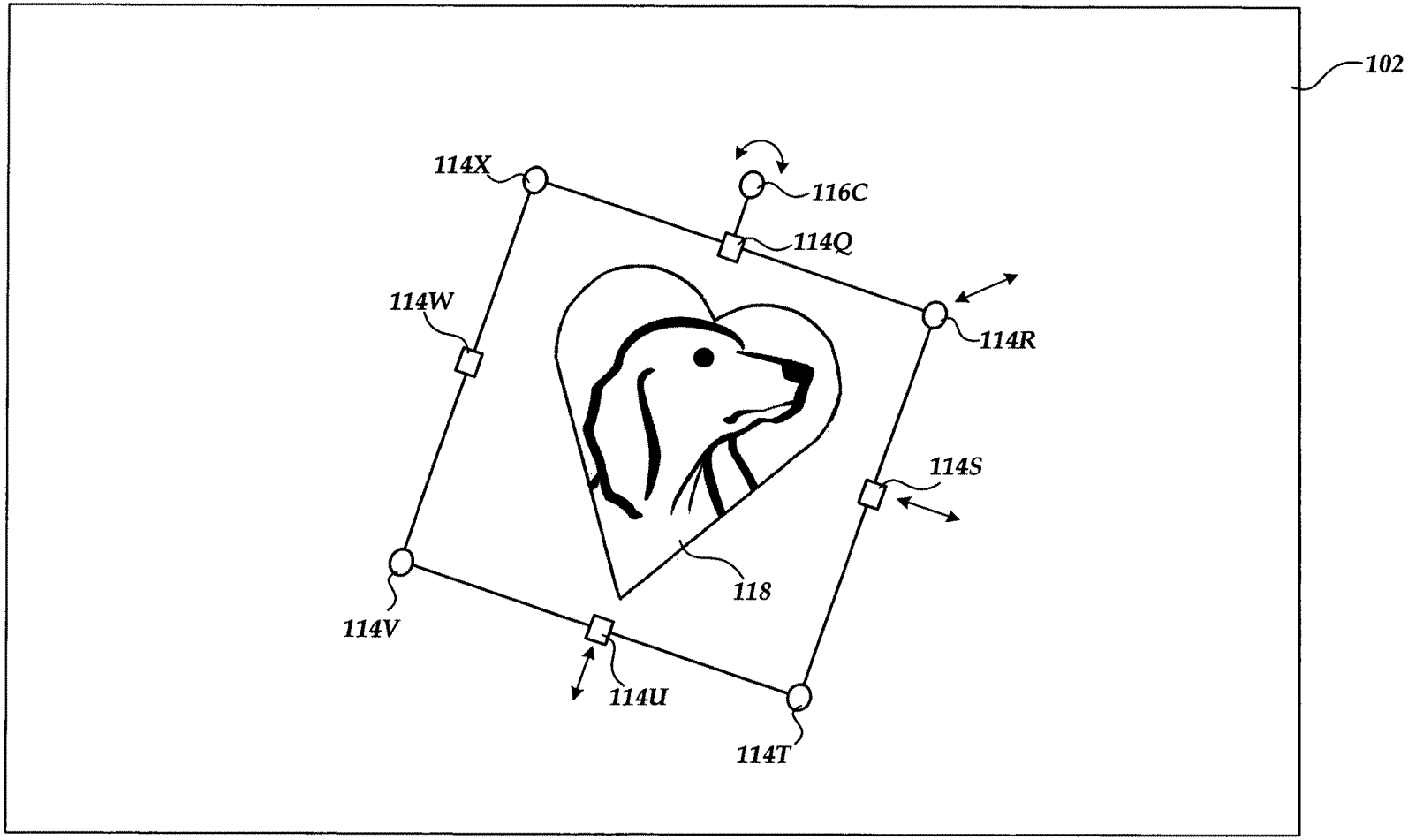

Referring now to FIG. 4, additional details will be provided regarding a normal editing mode of operation. In the example user interface shown in FIG. 4, a user has exited the mask edit mode of operation described above with reference to FIGS. 2 and 3. This may be performed, for instance, by selecting a portion of the canvas 102 outside of the digital image 104 or mask shape 112. Other types of user interface mechanisms may be provided for allowing a user to exit the mask edit mode of operation. When the mask edit mode of operation is exited, the portion of the digital image 104 within the mask shape 112 is mapped to the mask shape 112. This results in the mask-cropped shape 118 shown in FIG. 4. The mask-cropped shape 118 comprises the portion of the digital image 104 within the mask shape 112 mapped thereto.

When the mask-cropped shape 118 is selected in the normal editing mode of operation, another set of user interface controls is made available for modifying the size, rotation, and placement of the mask-cropped shape 118 on the canvas 102. In the example shown in FIG. 4, the set of user interface controls includes a number of drag handles 114Q-114X and a rotate handle 116C. Through the use of these controls, the mask-cropped shape can be resized and rotated. The mask-cropped shape 118 can also be selected and moved to any location on the canvas 102. It should be appreciated that in the normal editing mode of operation, the digital image 104 and mask shape 112 that make up the mask-cropped shape 118 move together in unison.

In one embodiment, a user interface control is also provided for allowing a user to return to the mask edit mode of operation described above to change the size, position, and placement of the digital image 104 and the mask shape 112 independently of one another. In this regard, it should be appreciated that according to embodiments, the portion 117 of the digital image 104 outside of the mask shape 112 is retained for use in future mask editing operations.

Figure 5:
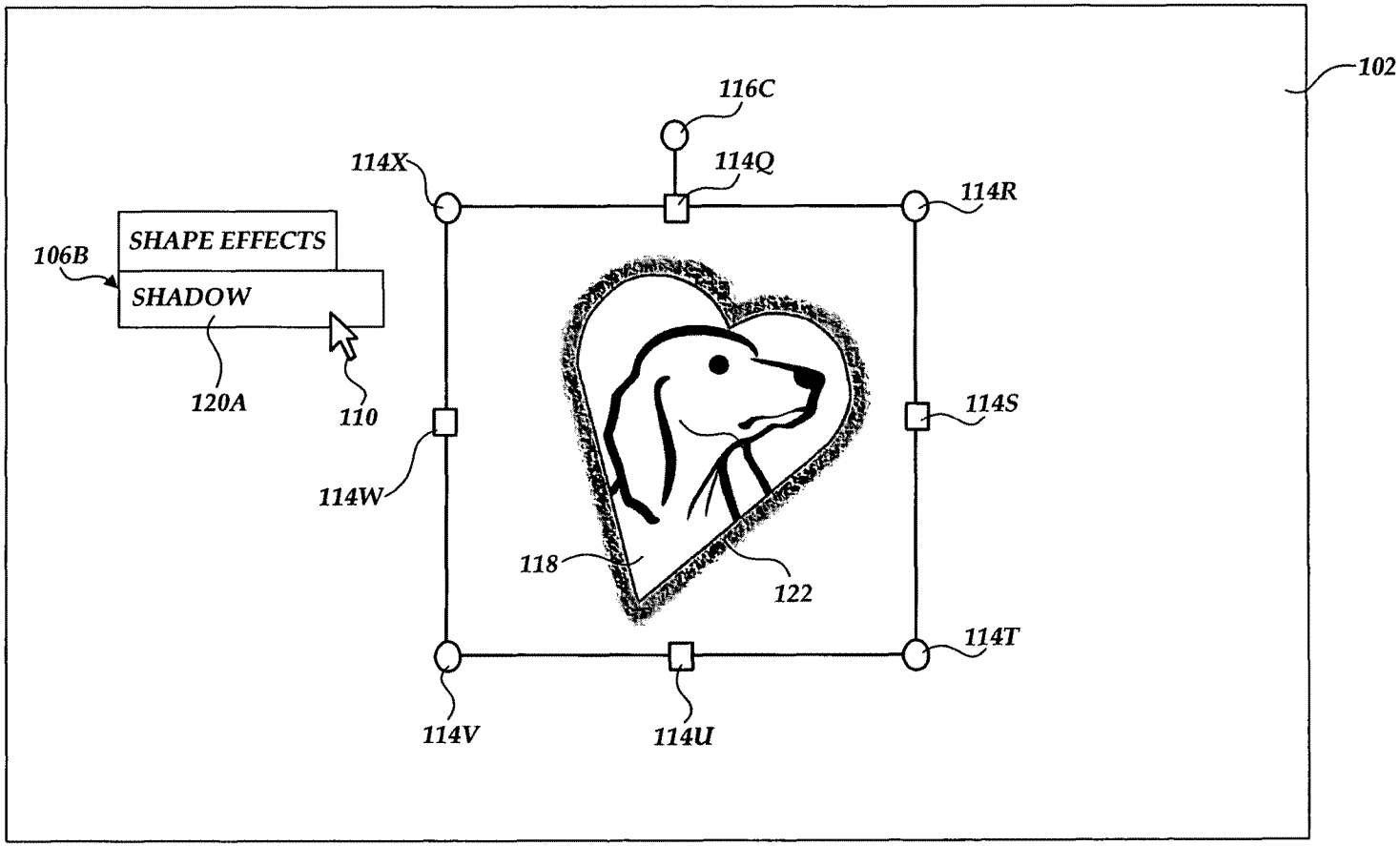

Referring now to FIG. 5, additional details will be provided regarding the operations that may be performed on a mask-cropped shape 118 in the normal mode of operation. In the example shown FIG. 5, a drop-down menu 106B has been displayed, including a menu item 120A for applying a shadow effect to the mask-cropped shape 118. It should be appreciated that because the digital image 104 is mapped to the mask shape 112 during the masking operation, effects may be applied to the edges of the mask-cropped shape 118. For instance, if a user selects the menu item 120A, such as through the use of the cursor 110, a shadow effect 122 can be applied to the edges of the mask-cropped shape 118. It should also be appreciated that other types of bevel effects, drop effects, and three-dimensional effects, may be applied to the edges of the mask-cropped shape 118. The mask-cropped shape 118 can also be rotated in three dimensions and Z-ordered with other shapes or objects. Other types of image effects may also be applied to the internal portion of the mask-cropped shape 118. Any type of editing or visual effect that can be performed on a digital image may also be performed on the mask-cropped shape 118.

Figure 6:
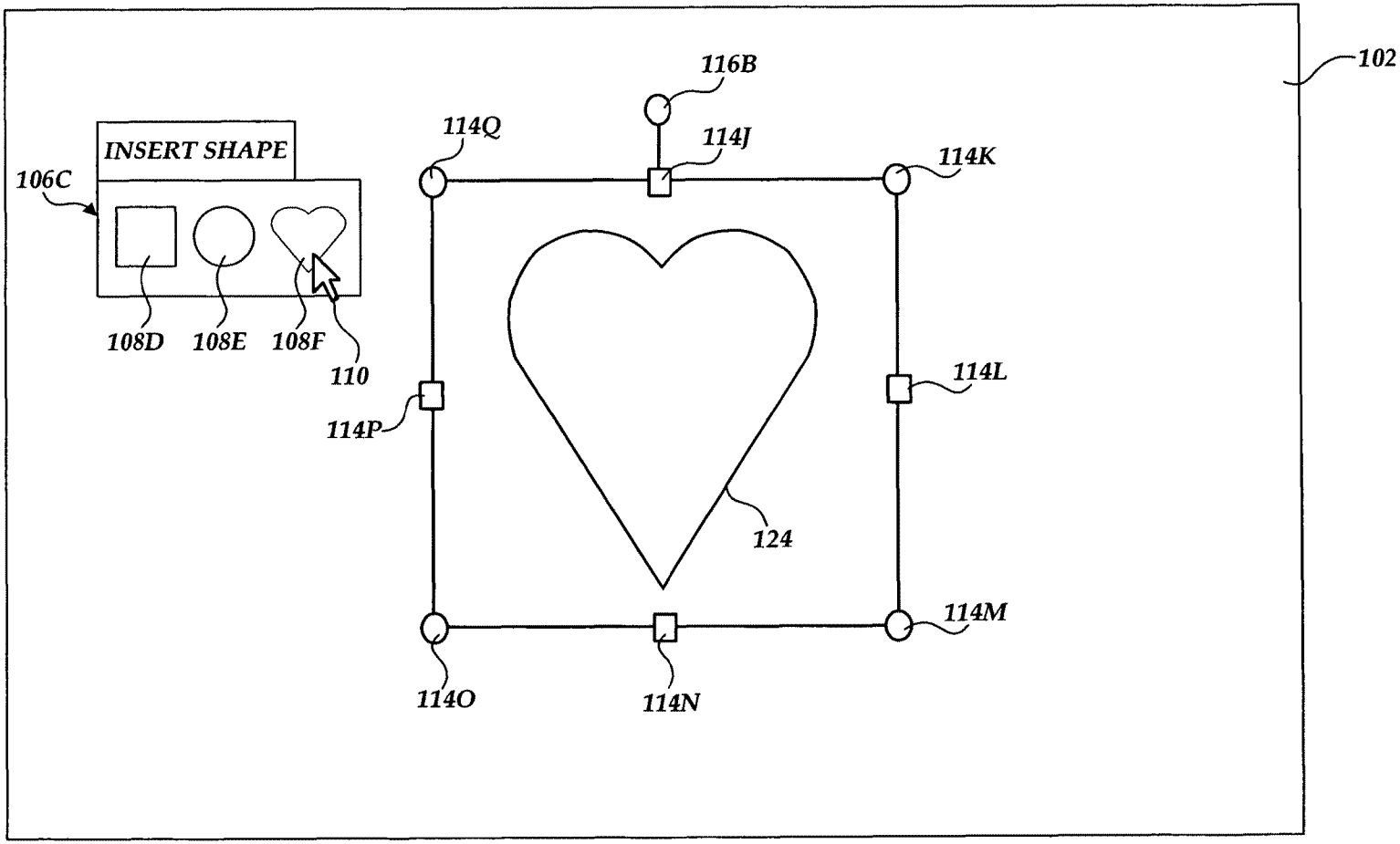

Referring now to FIG. 6, additional details will be provided regarding another mechanism for entering the mask edit mode of operation in one embodiment provided herein. As discussed briefly above, a user may also cause an application program to enter the mask edit mode of operation by inserting a shape 124 onto the canvas 102. This may be accomplished, for instance, by displaying a drop-down menu 106C that includes the icons 108D-108F corresponding to shapes that may be placed onto the canvas 102. If a user selects the icon 108F corresponding to the shape 124, such as through the use of the cursor 110, the corresponding shape 124 will be placed on the canvas 102. User interface controls such as the drag handles 114J-114Q and the rotate handle 116B may be provided in conjunction with the shape 124 in order to modify the size and rotation of the shape 124. Shape 124 may also be selected in order to modify the position of the shape 124 on the canvas 102. The user may also request that the shape 124 be filled with a digital image. Additional details regarding this process are described below with respect to FIG. 7.

Figure 7:
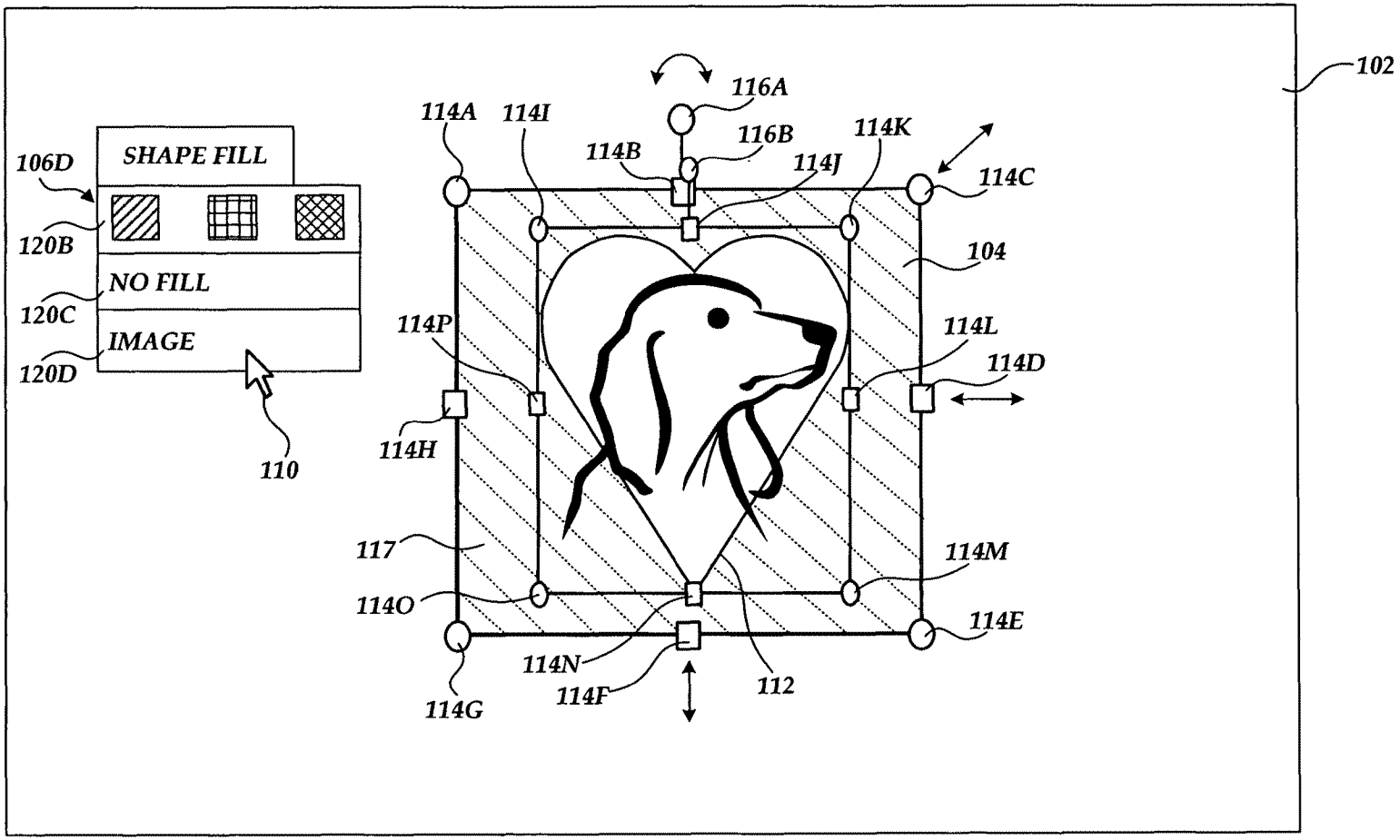

Referring now to FIG. 7, additional details will be provided regarding the process for entering the mask edit mode of operation by generating a request to fill a shape 124 with a digital image. In this implementation, a drop-down menu 106D has been displayed that includes a number of menu items 120B-120D for filling a shape 124. In particular, the menu item 120B corresponds to patterns that may be utilized to fill the shape 124. The menu item 120C may be selected to indicate that a fill should not be utilized. The menu item 120D may be selected, such as through the use of the cursor 110, to request that the shape 124 be filled with a digital image.

In response to the selection of the menu item 120D, a user may be presented with a user interface for selecting an appropriate digital image, such as the digital image 104, to be utilized in filling the shape 124. In response to such a selection, the mask edit mode is entered and the user interface controls illustrated in FIG. 7 are displayed. In particular, as shown in FIG. 7, the digital image 104 is displayed in conjunction with the mask shape 112 and the user interface controls for modifying the size, rotation, and position of the digital image 104 and the mask shape 112 independently of one another are provided. The portion 117 of the digital image 104 to be masked off following the exit from the mask edit mode is also displayed in a manner to indicate to the user that this portion will be cropped. It should be appreciated, therefore, that the mask edit mode may be entered by either the placement of an image on the canvas 102 and a request to apply a mask shape to the image, through the placement of a shape 124 on the canvas 102 and a request to fill the shape 124 with a digital image 104, or through a direct user request to enter the mask edit mode.

Figure 8:
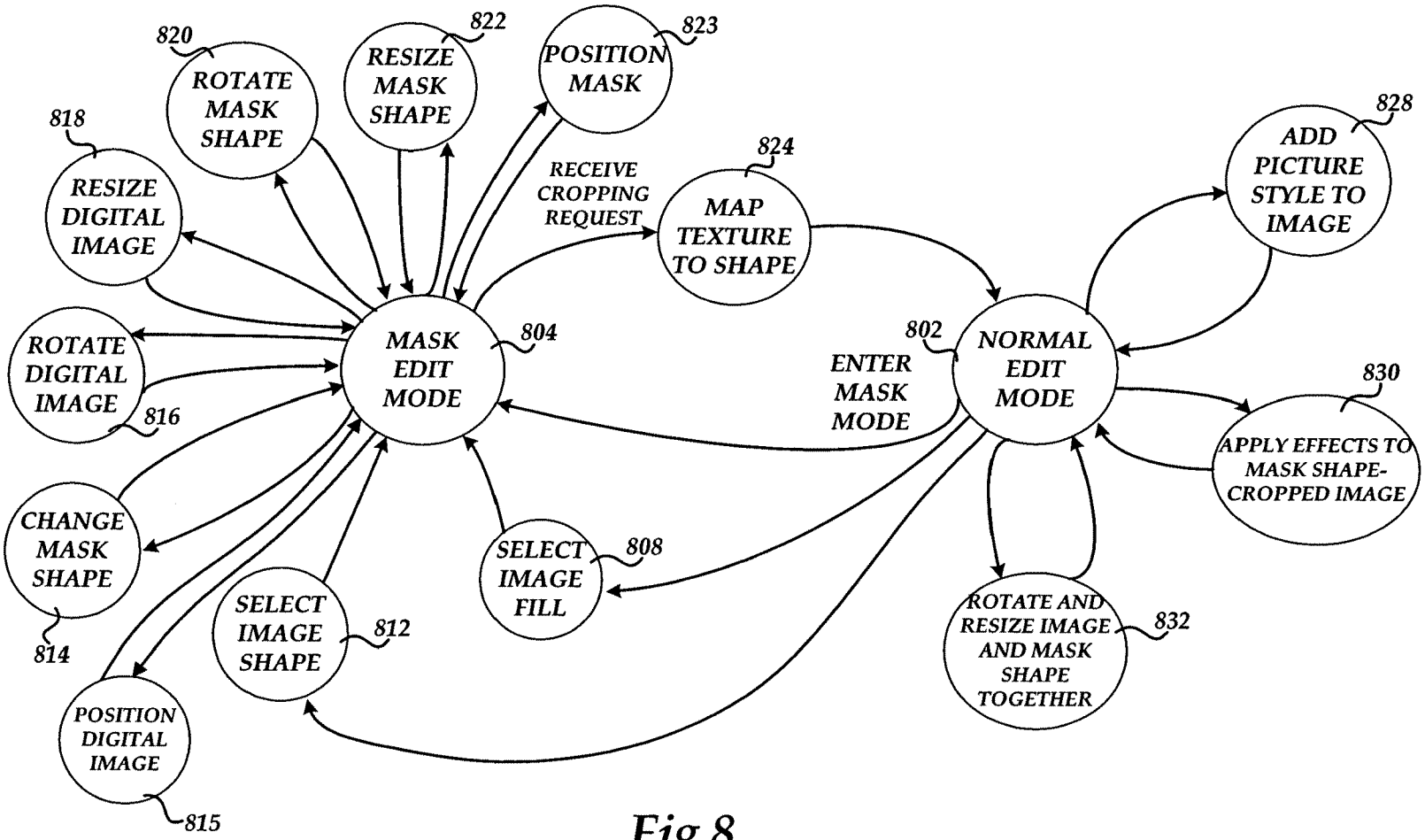
FIG. 8 is a state diagram showing aspects of a process presented herein in one embodiment for modifying the appearance of a digital image with a shape.

Referring now to FIG. 8, additional details will be provided regarding the embodiments presented herein for altering the appearance of a digital image using a shape. In particular, FIG. 8 includes a state diagram showing an illustrative process for altering a digital image using a shape in one implementation. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The process for altering the appearance of a digital image using a shape illustrated in FIG. 8 begins at state 802, at state 808, or at state 812. In particular, as discussed above, a user may enter the mask edit mode represented by the state 804 in FIG. 8 by requesting that a mask shape be applied to an image that has been placed onto the canvas 102. This is represented by the state 812 in FIG. 8. Once a user has selected the shape to be applied to the image, the process illustrated in FIG. 8 proceeds to the mask edit mode represented by the state 804.

As also discussed above, the mask edit mode represented by the state 804 may also be entered in response to receiving a user request to apply an image fill to a shape on the canvas 102. This is represented by the state 808. Once the user has selected the appropriate image to fill the shape, the mask edit mode is entered at state 804. The mask edit mode may also be entered from the normal edit mode represented by state 802 in response to the user selection of an image and an appropriate user interface control for entering the mask edit mode.

As discussed above, once in the mask edit mode represented by the state 804, user interface controls are provided for independently positioning, sizing, and rotating the digital image 104 and the mask shape 112. Utilizing these user interface controls, a user may rotate the mask shape 112, resize the mask shape 112, or reposition the mask shape 112 at states 820, 822, and 823, respectively. The user may also utilize these user interface controls to resize the digital image 104, rotate the digital image 104, and reposition the digital image 104 at states 818, 816, and 815, respectively.

While in the mask edit mode represented by the state 804, a user may also request to change the mask shape 112. This occurs at state 814. In order to change the mask shape 112, an appropriate user interface control may be displayed to the user including the available mask shapes that permits the user to select one of the mask shapes for masking the digital image 104. Facilities may also be provided for allowing the user to create a custom mask shape.

In order to crop the image 104 to the mask shape 112, a cropping request may be received. As discussed above, the cropping request may take the form of a request to exit the mask edit mode represented by the state 804. For instance, a user may select a portion of the canvas 102 outside of the digital image 104 and the mask shape 112 to request that the cropping operation be performed and the mask edit mode be exited. A user may also select an appropriate user interface control, such as a user interface button, for cropping the image 104 to the mask shape 112. In response to such a request, the process illustrated in FIG. 8 transitions to state 824 where the portion of the digital image 104 inside the mask shape 112 is mapped to the mask shape 112, thereby creating the mask-cropped shape 118. The process may then transition to state 802, where the normal editing mode is entered.

As discussed above, in the normal edit mode represented by the state 802, a set of user interface controls are provided for sizing, rotating, and positioning the mask-cropped shape 118. Due to the use of these controls, the digital image 104 and mask shape 112 may be rotated, resized, and positioned together. This is represented by the state 832 in FIG. 8. As also discussed briefly above, while in the normal edit mode represented by the state 802, a user may also apply edge effects to the mask-cropped shape. This is reflected by the state 830 in FIG. 8. Other operations that may be performed in the normal edit mode 802 include adding a picture style to an image at state 828. A picture style defines one or more properties that can be applied to the image, such as color or lighting effects.

Figure 9:
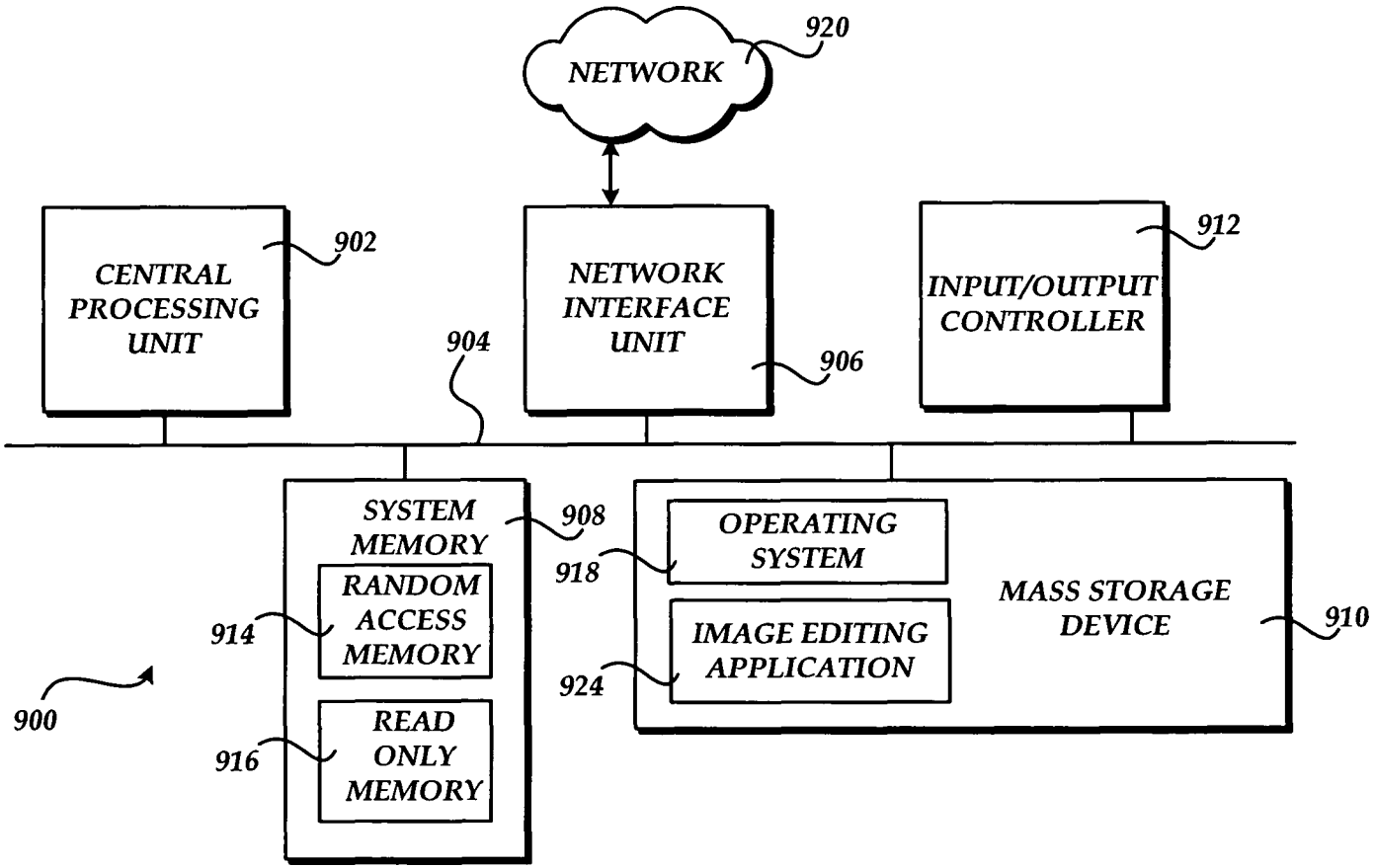
FIG. 9 is a computer architecture diagram showing an illustrative computer hardware and software architecture for a computing system capable of implementing the embodiments presented herein.

FIG. 9 shows an illustrative computer architecture for a computer 900 capable of executing the software components described herein for altering the appearance of a digital image using a shape in the manner presented above. The computer architecture shown in FIG. 9 illustrates a conventional desktop, laptop, or server computer and may be utilized to execute any aspects of an application program capable of altering a digital image with a shape in the manner described herein.

The computer architecture shown in FIG. 9 includes a central processing unit 902 ("CPU"), a system memory 908, including a random access memory 914 ("RAM") and a read-only memory ("ROM") 916, and a system bus 904 that couples the memory to the CPU 902. A basic input/output system containing the basic routines that help to transfer information between elements within the computer 900, such as during startup, is stored in the ROM 916. The computer 900 further includes a mass storage device 910 for storing an operating system 918, application programs, and other program modules, which are described in greater detail herein.

The mass storage device 910 is connected to the CPU 902 through a mass storage controller (not shown) connected to the bus 904. The mass storage device 910 and its associated computer-readable media provide non-volatile storage for the computer 900. Although the description of computer-readable media contained herein refers to a mass storage device, such as a hard disk or CD-ROM drive, it should be appreciated by those skilled in the art that computer-readable media can be any available computer storage media that can be accessed by the computer 900.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 900.

According to various embodiments, the computer 900 may operate in a networked environment using logical connections to remote computers through a network such as the network 920. The computer 900 may connect to the network 920 through a network interface unit 906 connected to the bus 904. It should be appreciated that the network interface unit 906 may also be utilized to connect to other types of networks and remote computer systems. The computer 900 may also include an input/output controller 912 for receiving and processing input from a number of other devices, including a keyboard, mouse, or electronic stylus (not shown in FIG. 9). Similarly, an input/output controller may provide output to a display screen, a printer, or other type of output device (also not shown in FIG. 9).

As mentioned briefly above, a number of program modules and data files may be stored in the mass storage device 910 and RAM 914 of the computer 900, including an operating system 918 suitable for controlling the operation of a networked desktop, laptop, or server computer. The mass storage device 910 and RAM 914 may also store one or more program modules. In particular, the mass storage device 910 and the RAM 914 may store an image editing application program 924 or another type of application program that provides the functionality described herein for altering the appearance of a digital image using a shape.

Based on the foregoing, it should be appreciated that technologies for altering the appearance of a digital image using a shape are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for altering the appearance of a digital image with a shape, the method comprising:

presenting, by a computer executing an application program, a canvas, the canvas comprising a word processing document, a presentation document, or a spreadsheet document;

determining, by the computer, if a request to apply a mask shape to a digital image has been received;

[determining, by the computer, if a request to fill the mask shape with the digital image has been received;]

in response to receiving the request to apply the mask shape to the digital image [or in response to receiving the request to fill the mask shape with the digital image], entering a first editing mode in which the computer displays a first set of user interface controls on the digital image for modifying a size, a position and a rotation of the digital image within the canvas independently of the mask shape and a second set of user interface controls on the mask shape for modifying an appearance of the mask shape upon the digital image and independently of the digital image, the first set of user interface controls and the second set of user interface controls being useable without changing from the first editing mode;

receiving, by the computer, a cropping request comprising a request to exit the first editing mode;

in response to receiving the cropping request, mapping the digital image to the mask shape to create a mask-cropped shape;

exiting the first editing mode; and entering a second editing mode in which the computer displays a third set of user interface controls for modifying an appearance of the mask-cropped shape.

2. The method of claim 1, wherein the second set of user interface controls comprise user interface controls for modifying a size, a position, and a rotation of the mask shape independently of the digital image.

3. The method of claim 1, wherein a portion of the digital image located outside of the mask shape is displayed to indicate that the portion will be cropped when the first editing mode is exited.

4. The method of claim 1, wherein the third set of user interface controls comprise user interface controls for modifying a size, a position, and a rotation of the mask-cropped shape.

5. The method of claim 1, further comprising applying an effect to the mask-cropped shape.

6. The method of claim 5, further comprising providing one or more user interface controls for editing a geometry of the mask shape.

7. A computer-readable medium having computer-executable instructions stored thereon which, when executed by a computer, cause the computer to:

present a canvas, the canvas comprising a word processing document, a presentation document, or a spreadsheet document;

determine [if] *one of whether* a request to apply a mask shape to a digital image has been received [;] *or*

[determine if] a request to fill the mask shape with the digital image has been received;

in response to [receiving the request to fill the mask shape with the digital image or in response to receiving the request to apply the mask shape to the digital image] *the determination*, display a first set of user interface controls on the digital image in which a size, a position and a rotation of the digital image within the canvas can be modified independently of an appearance of the mask shape;

modify one of the size, the position or the rotation of the digital image within the canvas in response to user input received at the first set of user interface controls on the digital image;

receive a cropping request to apply the mask shape to the digital image;

in response to receiving the cropping request,

[to] map the digital image to the mask shape to create a mask-cropped shape, and

[to] provide a second set of user interface controls on the mask shape for modifying an appearance of the [digital image] *mask shape* independently of the digital image; and modify the appearance of the mask shape upon the digital image in response to user input received at the second set of user interface controls on the mask shape.

8. The computer-readable medium of claim 7, comprising further computer-readable instructions which, when executed by the computer, will cause the computer to display a portion of the digital image located outside of the mask shape in a manner that indicates that the portion will be cropped when a cropping request is received.

9. The computer-readable medium of claim 7, comprising further computer-readable instructions which, when executed by the computer, will cause the computer to provide a third set of user interface controls for modifying a size, a position, and a rotation of the mask-cropped shape.

10. The computer-readable medium of claim 7, comprising further computer-readable instructions which, when executed by the computer, will cause the computer to apply an edge effect to an edge of the mask-cropped shape.

11. A method for altering the appearance of a digital image with a shape, the method comprising:

presenting, by a computer executing an application program, a canvas, the canvas comprising a word processing document, a presentation document, or a spreadsheet document;

entering, by the computer, a mask edit mode of operation;

providing, by the computer in the mask edit mode of operation, a first set of user interface controls on the digital image for modifying a size, a position, and a rotation of the digital image within the canvas independently of a size, a position, and a rotation of a mask shape;

providing, by the computer in the mask edit mode of operation, a second set of user interface controls on the mask shape for modifying a size, a position, and a rotation of the mask shape upon the digital image and independently of the size, the position, and the rotation of the digital image, the first set of user interface controls and the second user interface controls being useable without changing from the mask edit mode of operation;

displaying, by the computer while in the mask edit mode of operation, a portion of the digital image outside the mask shape in a manner that indicates that the portion will be cropped when a cropping request is received;

receiving a cropping request, the cropping request comprising a request to exit the mask edit mode of operation;

in response to receiving the cropping request, mapping the digital image to the mask shape to crop the portion and to create a mask-cropped shape, exiting the mask mode of operation, and entering a normal edit mode of operation; and providing, by the computer in the normal edit mode of operation, a third set of user interface controls for modifying a size, a position, and a rotation of the mask-cropped shape.

12. The method of claim 11, further comprising applying one or more effects to an edge of the mask-cropped shape while in the normal editing mode.

13. The method of claim 5, wherein applying the effect to the mask-cropped shape comprises applying an edge effect to an edge of the mask-cropped shape, the edge effect comprising a shadow effect.

14. The method of claim 5, wherein applying the effect to the mask-cropped shape comprises applying an edge effect to an edge of the mask-cropped shape, the edge effect comprising a three-dimensional effect.

15. The method of claim 1, wherein the mask shape is a three-dimensional object.

16. The method of claim 1, further comprising:

in response to receiving a request to exit the second editing mode, exiting the second editing mode; and in response to receiving a request to reenter the first editing mode, reentering the first editing mode.

[17. The computer-readable medium of claim 7, comprising further computer-readable instructions which, when executed by the computer, will cause the computer to:

in response to receiving a request to exit the second editing mode, exit the second editing mode; and in response to receiving a request to reenter the first editing mode, reenter the first editing mode.]

18. The method of claim 11, further comprising:

in response to receiving a request to exit the normal edit mode of operation, exiting the normal edit mode of operation; and in response to receiving a request to reenter the mask edit mode of operation, reentering the mask edit mode of operation.

*19. A computing system comprising:*

*at least one processor; and*

*at least one memory storing computer-readable instructions that when executed by the at least one processor cause the computing system to:*

*present a canvas, the canvas comprising a word processing document, a presentation document, or a spreadsheet document;*

*determine one of whether a request to apply a mask shape to a digital image has been received or a request to fill the mask shape with the digital image has been received;*

*in response to the determination, display a first set of user interface controls on the digital image in which a size, a position and a rotation of the digital image within the canvas can be modified independently of an appearance of the mask shape;*

*modify one of the size, the position or the rotation of the digital image within the canvas in response to user input received at the first set of user interface controls on the digital image;*

*receive a cropping request to apply the mask shape to the digital image;*

*in response to receiving the cropping request,*

*map the digital image to the mask shape to create a mask-cropped shape, provide a second set of user interface controls on the mask shape for modifying an appearance of the mask shape independently of the digital image; and*

*modify the appearance of the mask shape upon the digital image in response to user input received at the second set of user interface controls on the mask shape.*

*20. The computing system of claim 19, wherein the second set of user interface controls comprise user interface controls for modifying a size, a position, and a rotation of the mask shape independently of the digital image.*

* * * * *